(12) United States Patent
Ji et al.

(10) Patent No.: US 7,940,850 B2
(45) Date of Patent: May 10, 2011

(54) METHOD FOR ENCODING FRAME DATA

(75) Inventors: Lusheng Ji, Randolph, NJ (US); Samrat Bhattacharjee, Silver Spring, MD (US); Bo Han, College Park, MD (US); Seungjoon Lee, Springfield, NJ (US); Robert Miller, Convent Station, NJ (US)

(73) Assignee: AT&T Intellectual Property II, LP

( * ) Notice: Subject to any disclaimer, the term of this patent is extended or adjusted under 35 U.S.C. 154(b) by 568 days.

(21) Appl. No.: 12/151,815

(22) Filed: May 9, 2008

(65) Prior Publication Data

US 2009/0279596 A1   Nov. 12, 2009

(51) Int. Cl.
*H04K 1/10* (2006.01)
*H04L 27/28* (2006.01)
(52) U.S. Cl. ........ 375/260; 375/261; 375/262; 375/265; 375/349; 375/257; 455/501; 455/504; 455/63.1; 455/65

(58) Field of Classification Search .......... 375/260–262, 375/265, 257, 299, 346; 455/501, 504, 63.1, 455/65
See application file for complete search history.

(56) References Cited

U.S. PATENT DOCUMENTS 7,636,381 B2 * 12/2009 Forenza et al. ............... 375/141
7,813,441 B2 * 10/2010 Jalali et al. .................... 375/267

* cited by examiner

*Primary Examiner* — Phuong Phu
(74) *Attorney, Agent, or Firm* — Henry T. Brendzel

(57) ABSTRACT

In applications where data is transmitted in frames of symbols and the transmission medium is such that the probability of correct reception of symbols is, on the average, not uniform for different symbols in a frame, transmission of test frames enables creation of information about the different probabilities of correct reception, and that information is employed by the transmitter to control the manner in which symbols are transmitted so as to ameliorate the effects of the different probabilities of correct reception.

14 Claims, 2 Drawing Sheets

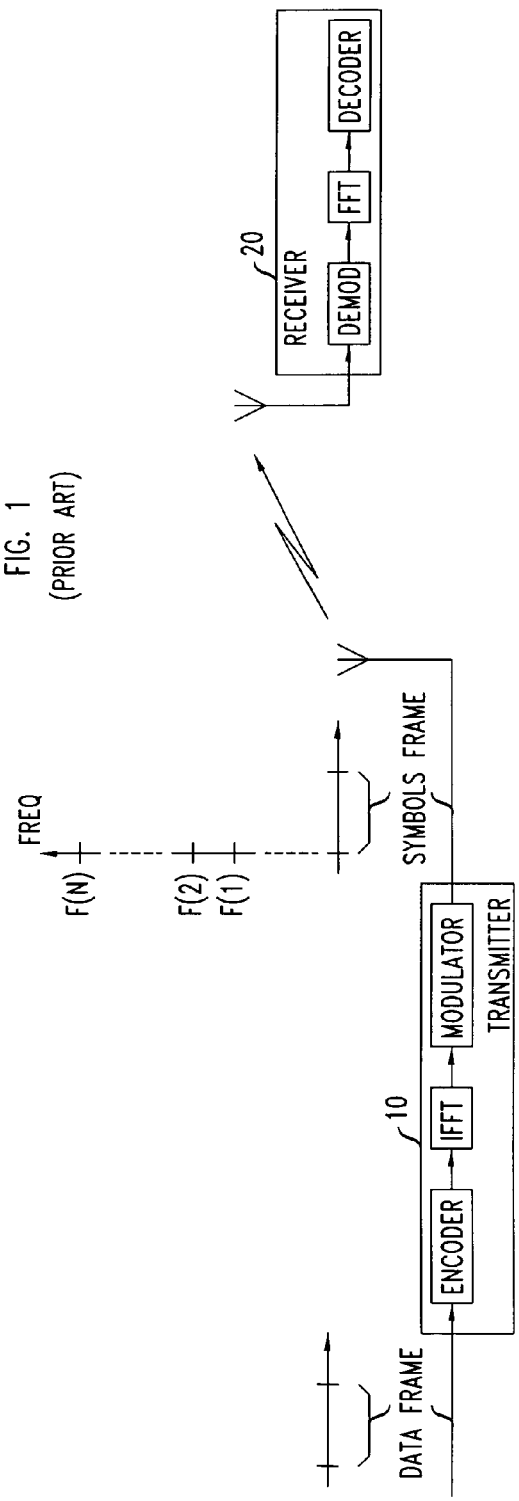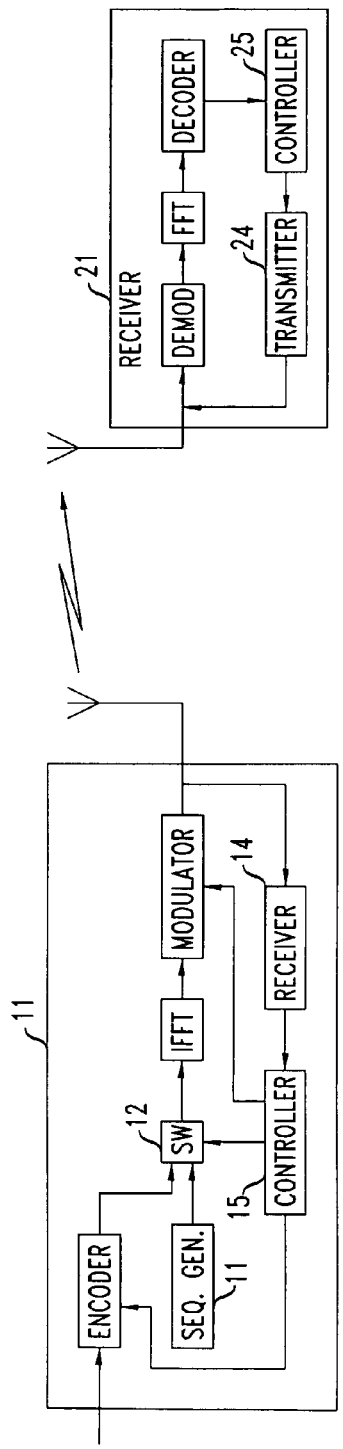

METHOD FOR ENCODING FRAME DATA

BACKGROUND OF THE INVENTION

This invention relates to communication and, more particularly, to effective bandwidth utilization in an environment where transmission is in the form of information frames.

One illustration of such an arrangement where data is processed and transmitted in frames is Orthogonal Frequency Division Multiplexing (OFDM), where different symbols of a frame are transmitted over different frequency sub-bands (frequency bins). The communication channel typically has a non-uniform frequency response, and this non-uniformity results in non-uniform error probability values for different sub-bands, (frequency bins) in a frame. Thus, the frame in an OFDM arrangement can be viewed to exist along the frequency axis, and the symbols are placed in the frequency bins along the frequency axis.

Another illustration is an arrangement where a receiver's clock is periodically synchronized to a transmitter's clock. The period between synchronization instances can be viewed as a frame, and in such arrangements, because of clock synchronization degradation as the frame progresses, information modules that are sent at the beginning of the frame, i.e., shortly after synchronization, have a lower error probability than information modules that are sent at the end of the frame. Thus, in such an arrangement the frame is along the time axis, and the bins occupy different time intervals along the time axis.

Yet another illustration relates is an OFDM arrangement that also employs a periodic resynchronization of the receiver's clock, and that imparts to the arrangement the notion of a frame that includes bins along both the time axis and the frequency axis.

In the context of this disclosure, a frame is a unit of information transmission in connection with which information-carrying bins that make up the frame have transmission error probabilities that characterize the respective bins.

These symbol error probability dynamics present a challenge and an opportunity to communication system design.

SUMMARY

An advance in the art is achieved by determining the error probability pattern for the different bins of transmitted frames, and tailoring the transmission mode to compensate for the different error rates in the different frame bins, thereby achieving a more effective utilization of the communication channel. In one embodiment, a different coding approach is used for symbols in different bin positions in the frame. In another embodiment, forward error correcting (FEC) codes of different strengths are incorporated in symbols in different bin positions of the frame. In yet another embodiment, retransmission is used in instances where errors are identified but cannot be corrected, and at such retransmissions, symbols are relocated to different bin positions in the retransmitted data from where they were originally placed. An agreed-upon protocol between the transmitter and the receiver provides the information that is necessary to appropriately affect the transmitter.

BRIEF DESCRIPTION OF THE DRAWING

FIG. 1 depicts a prior art transmitter and receiver pair that employs the OFDM communication scheme;

FIG. 2 shows the transmitter and the receiver in accord with the principles disclosed herein;

DETAILED DESCRIPTION

Figure 3:
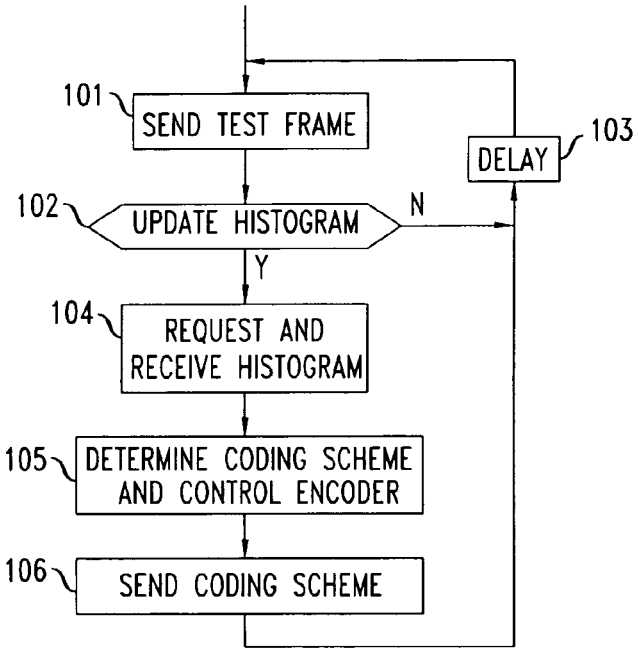
FIG. 3 is a flow chart of a process executed in the FIG. 2 transmitter.

FIG. 1 shows an illustrative prior art OFDM arrangement (the first example above) where a sequence of data bits, typically, kN bits long, is divided into N groupings that each contains k bits. In transmitter 10 the encoder encodes each grouping into a symbol, to result in N symbols per frame, and those symbols are mapped to N frequency bins by employing an inverse Fast Fourier Transform (IFFT) module. The resulting signals are modulated and transmitted onto the communications medium. Receiver 20 receives the multi-frequency signal, detects the symbols, converts the set of N symbols into N groupings (k-bits each) and thus the data stream that entered transmitter 10 is recovered in receiver 20.

In packet based communication systems, each packet that is transmitted by a transmitter typically consists of a header portion and a data portion. The header portion of the packet contains information that helps the receiver to synchronize its clock with the transmitter's clock so it can determine frame boundaries, as well as information that describes the characteristics of the data portion frames to be followed, such as how many frames to be transmitted as data portion of the packet. Typically the header is made up by more than one frame. These frames may not be encoded in the same fashion, nor do they have to be encoded in the same fashion as data portion frames. The data portion of the packet is made of one or more frames, which contain the payload bits and additional pre-pending and post-pending bits. The total size of the data portion is a multiple of kN bits.

As mentioned earlier, since the transmission channel does not have uniform transmission characteristics across the relevant frequency band, the probability of correctly detecting the symbols may be different for symbols at different positions in the frame. What that means is that absent some special arrangements, when signal magnitudes at the receiver are low relative to additive noise and interference, some symbols are more likely to be detected erroneously than other symbols. In addition, despite the fact that they are mapped to the same frequency bin by IFFT transformation, symbols at the same position of different frames within the same packet may have different probability of being correctly detected. For example, clock drifting is one of the reasons for this inter-frame error probability difference. As mentioned before, receiver clock is synchronized with the transmitter clock only at the beginning of the packet, by the packet header. It is very important for a receiver's clock to be synchronized with the transmitter's clock because it affects how well the receiver truncates the received signals into time windows that match with the boundaries of frames when the transmitter transmits them. As the processing of the frames of the packet proceeds, this synchronization degrades, causing symbols of a later frame of a packet to be more likely decoded incorrectly than symbols mapped to the same frequency bin but in earlier frames of the same packet. Other factors such as power and gain control loops may also cause such inter-frame symbol error characteristics differences.

In accord with the principles disclosed herein information is developed—for example, a histogram—that provides a probability measure of erroneously detected symbols as a function of symbol position in the frame and the frame's sequential position in the packet. Once the transmitter has the histogram (for example, created in the receiver and communicated to the transmitter), the transmitter can adjust itself for enhanced performance.

FIG. 2 presents an illustrative block diagram of transmitter 11 and receiver 21 in accord with the principles disclosed herein. Transmitter 11 includes an encoder, an IFFT module, and a modulator, as in FIG. 1, and it also includes a switch 12 that is interposed between the encoder and the IFFT module, a test sequence generator 13 that is connected to switch 12, a receiver 14, and a controller 15 that receives information from receiver 14 and controls the encoder and switch 12. Similarly, receiver 21 includes demodulator that feeds an FFT module whose output is decoded in a decoder module, and it also includes a controller 25 that is responsive to signals provided by the decoder and a transmitter 24 for sending information back to transmitter 11.

FIG. 3 is a flow diagram of the operation within transmitter 11, executed primarily by controller 15. Pursuant to step 101, controller 15 directs sequence generator 13 to output a preselected set of test symbols as the test frame, and conditions switch 12 to apply the test frame to the IFFT. Thereafter, control passes to step 102 which determines—according to some preselected algorithm, such as a time of day—whether the histogram needs to be updated. If not, control passes to delay step 103 which injects a preselected delay before returning to step 101. When step 102 determines that the histogram should be updated, control passes to step 104 whereupon controller 15 generates a Histogram-Request message and applies it to the modulator. This message is transmitted by transmitter 11, received by receiver 21, and the receiver responds by transmitting the histogram, which is received within transmitter 11 by receiver module 14 and applied to controller 15.

Control then passes to step 105 where controller 15 determines the coding scheme that is appropriate for the received histogram, and controls the transmitter's encoder accordingly. Lastly, control passes to step 106 where controller 15 informs the transmitter of the coding scheme to be effected, according to the determination made in step 105.

Figure 4:
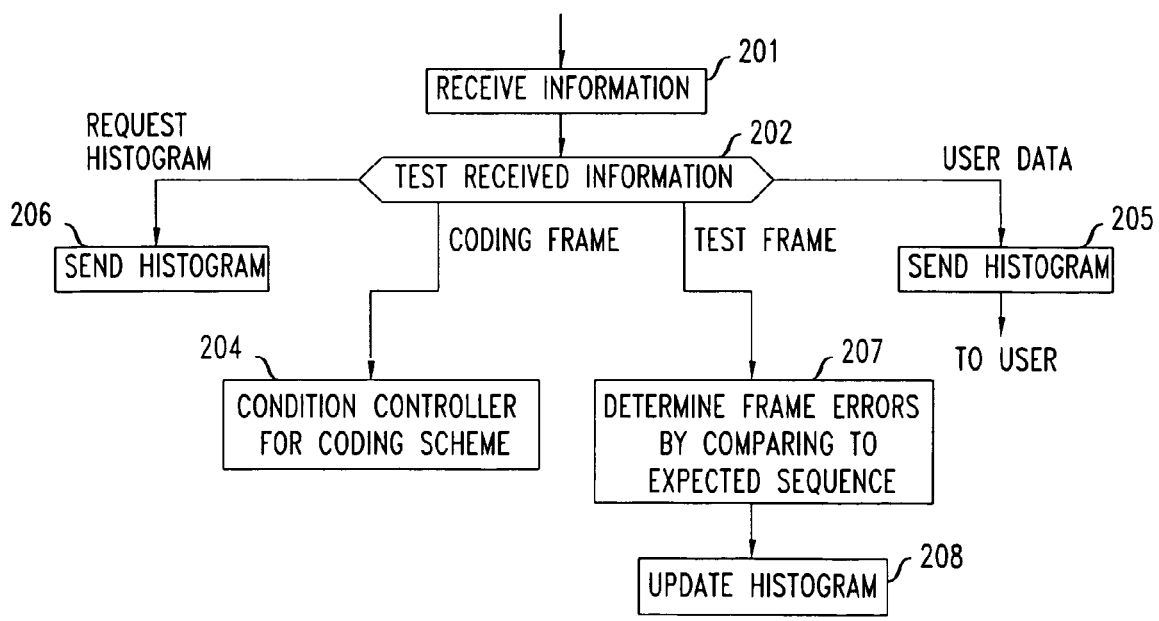
FIG. 4 is a flow chart of a process executed in the FIG. 2 receiver.

FIG. 4 is a flow diagram within a receiver in accord with the principles disclosed herein. At step 201 information is received, and control passes to step 202. Step 202 ascertains whether the received information represents (a) user data, (b) a request to provide the histogram, (c) a test frame, or (d) information that informs the receiver of the coding scheme employed at the transmitter.

If it is a coding scheme frame, which informs receiver 21 of the coding scheme employed at the transmitter, control passes to step 204 where controller 25 is conditioned to operate with the transmitter's coding scheme.

If the received information is user data, control passes to step 205 which decodes the data and forwards it to the application for which receiver 21 is employed. In the context of this invention, the decoding of data in step 205 may include error correcting (when the transmitter's encoding scheme employs FEC codes), and in some embodiments it may include communication with transmitter 11 to request a retransmission.

If the received information is a request to send a histogram, control passes to step 206, pursuant to which controller 25 sends the histogram to transmitter 11 via transmitter unit 24.

If the received information is a test frame, control passes to step 204 where the received frame data is decoded and compared to the expected frame data. Those decoded symbols of the test frame that are erroneous are identified, and the information about the identified erroneous symbols (and the correctly received symbols) is applied to update a histogram that is kept by the receiver's controller (in an associated memory that, for sake of clarity, is not shown). Illustratively, the histogram is simply a table of N entries, and each time a test frame is received and decoded, the entries of the table are updated; for example, by using the formula $A(i)=aA(i)+K(i)$, where $A(i)$ the table entry value for symbol i of the frame, a is a selected constant that is less than 1, and $K(i)$ is 1 if received symbol i, is correct and 0 if the received symbol i is incorrect.

For packet based communication systems, correspondingly, the test pattern and histogram are organized on packet level. Each test packet consists of a number of test frames, as many as the number of frames that the longest possible packet converts to. The histogram also consists of a number of tables, one for each frame of the test packet as described previously. For systems within which symbol level error information is not available, the per-frame histogram table can be a table of kN entries, one entry for each bit contained in the frame.

Because in certain systems the inter-frame error probability differences are mainly the result of long term channel characteristics and hardware characteristics, the histograms in these systems will remain unchanged if the transmitter and receiver remain stationary and the histograms will be the same for any transmitter and receiver pair of the same hardware configuration and at the same locations. In this case the histogram may be measured for particular transmitter-receiver location and hardware configuration (e.g. manufacture, chipset, version, etc) pairings and stored. If during operation, a pair of transmitter and receiver are at the locations matching those of a stored record and they are of the same hardware configuration combination as that of the same stored record, the pre-measured histogram may be used to determine coding scheme instead of requiring the transmitter and receiver to discover the error probabilities on the fly by transmitting test frames.

The histogram disclosed above is capable of generating fairly good estimates of the probabilities of errors as a function of the symbol location within the frame, i, or location within the packet, which includes both the symbol location within the frame and the frame location within the packet, but many applications do not need a very fine granularity. In some applications, in fact, a two-level histogram ("good" and "error prone") suffices. This two-level histogram may be absolute, or relative. That is, all frequency bins where the probability of error is greater than a preselected threshold may be declared to be error prone. Alternatively, a preselected number of bins, P, with the highest probability of error are declared to be error prone. Such embodiments also have the benefit that sending the entire histogram is not necessary because one can send only the i values that correspond to the "error prone" bins. In other embodiments it might be found advantageous to send the i values that correspond to the "error prone" bins as well as the $A(i)$ values.

The communication protocol between transmitter 11 and receiver 21 that is described above is one where it is the transmitter that initiates transmission of the test frame, and it is the transmitter that initiates the communication of the histogram from receiver 21 to transmitter 11. It should be realized that this is illustrative only, and that other protocols may be used that are equally viable. Also, the embodiment disclosed above has the receiver compute the histogram, but it is also possible to have the transmitter compute the histogram (though sometimes that will turn out to be less efficient).

As for coding of data in light of the different error probabilities, a number of techniques may be used though, not unexpectedly, all reduce the system's data throughput in exchange for reduced transmission error effects.

In accord with one illustrative embodiment symbols are encoded using two or more different symbol constellations.

In an embodiment that uses two constellations, for example, a spare constellation is used to send symbols that are placed in frequency bins that provide poorer transmission conditions (error prone bins), and a denser constellation is used to send all other symbols.

As is well known, a sparse constellation encodes fewer bits per symbol than the denser constellation, but symbols of a sparser constellation are more likely to be received correctly in the presence of noise than symbols of a denser constellation, and this implies that the number of data bits that each frame undertakes to transfer to receiver 21 is less than kN. Illustratively, if a system implementation is chosen where P symbols are sent using a less dense constellation that communicates $k'<k$ bits, the total number of bits that a frame will communicate is $k(N-P)+k'P$ where $k'$ is the number of bits from which the sparse constellation encodes a symbol.

In accord with another illustrative embodiment, FEC coding may be employed. Illustratively, ⅔ rate coding is used for symbols that are to be placed in error prone bins, and ¾ rate coding is used for the other symbols. This is an example that employs only two levels of FEC coding, but it should be understood that more than two levels are possible.

In accord with yet another illustrative embodiment, a retransmission approach is used in combination with an error detection approach. For example, one or more parity bits may be associated with the set of symbols that are transmitted over the error-prone frequency bins. Receiver 21 analyses the received symbols in light of the one or more parity bits and decides whether to request a retransmission.

In accord with a still different illustrative embodiment, if retransmissions of a frame are required, the symbols in the original frame may be repositioned to different bins in the retransmitted frame. The repositioning algorithm may be pre-arranged between the transmitter and the receiver.

Regarding the information that transmitter 111 sends to receiver 21 to inform it of the coding approach that is used by the transmitter, illustratively it consists of a frame where the information in a bin identifies the encoding approach used for that bin (for example, the kind of FEC coding that is employed). In some applications, however, such as the one described above where one of two FEC codes is used and the receiver knows a priori that either ⅔ coding or ¾ coding is used, all that is necessary to provide to the receiver is the positions of the frame bins that correspond to, for example, the ⅔ bit rate coding.

It should be understood that applicants' contribution stems from the realization that, in some applications, the information that is communicated by a transmitter may be viewed as being communicated in frames composed of information-carrying bins that have transmission error probabilities that characterize the respective bins, and from the realization that the information about those probabilities can be used to advantage in the transmitter to create a better communication system. Accordingly, embodiments other than the one disclosed in detail above may employ the principles of this invention. Also, various modifications can be made to the illustrative embodiment disclosed above without departing from the principles of this invention.

The invention claimed is:

1. A communication method involving a transmitter, a receiver, and a step of said transmitter sending to the receiver a frame of b bins, with known symbols in each of said b bins (test frame), interposed therebetween frames of b bins each, with data symbols in said b bins (data frames), the improvement comprising the steps of:

processing said test frames received by said receiver, and installing in said transmitter a measure of error probability developed by said processing for B of said b bins, where $B \leq b$;

said transmitter determining a coding scheme based on the installed error probability measures;

said transmitter sending said data frames with information encoded according to said coding scheme;

establishing in said receiver said coding scheme;

and decoding in said receiver received data frames according to the established coding scheme.

2. A communication method involving a transmitter, a receiver, and a step of said transmitter sending to the receiver a frame of b bins, with known symbols in each of said b bins (test frame), interposed therebetween frames of b bins each, with data symbols in said b bins (data frames), the improvement comprising the steps of:

processing said test frames received by said receiver, and installing in said transmitter a measure of error probability developed by said processing for B of said b bins, where $B \leq b$;

said transmitter determining a coding scheme based on the installed error probability measures;

said transmitter sending said data frames with information encoded according to said coding scheme;

establishing in said receiver said coding scheme;

and decoding in said receiver received data frames according to the established coding scheme;

where the B bins correspond to those of said b bins whose measure of error probability exceeds a preselected threshold.

3. The method of claim 1 where B is preselected, and the B bins are those of said b bins that have the highest error probabilities.

4. The method of claim 1 where said step of processing comprises said comparing symbols received in a test frame to said known symbols, and updating a histogram based on results of said comparing.

5. The method of claim 4 where said histogram may be measured beforehand for particular transmitter and receiver locations and hardware configuration pairings and resultant histogram stored in a database, and said stored histogram is retrieved and used to determine code scheme if the locations of a pair of transmitter and receiver and their hardware configurations match with the stored records.

6. The method of claim 4 where said step of installing in said transmitter comprises said receiver sending information about said histogram to said transmitter, and said transmitter storing said information in a memory.

7. The method of claim 6 where said step of sending information about said histogram is executed pursuant to a request message from said transmitter.

8. The method of claim 1 where said step of determining a coding scheme selects from a set that includes different constellations, and different Forward Error Correction coding.

9. A communication method involving a transmitter, a receiver, and a step of said transmitter sending to the receiver a frame of b bins, with known symbols in each of said b bins (test frame), interposed therebetween frames of b bins each, with data symbols in said b bins (data frames), the improvement comprising the steps of:

processing said test frames received by said receiver, and installing in said transmitter a measure of error probability developed by said processing for B of said b bins, where $B \leq b$;

said transmitter determining a coding scheme based on the installed error probability measures;

said transmitter sending said data frames with information encoded according to said coding scheme;

establishing in said receiver said coding scheme;

and decoding in said receiver received data frames according to the established coding scheme;

where said step of determining a coding scheme selects from a set that includes different constellations, and different Forward Error Correction coding, and said step of determining a coding scheme encompasses a retransmission protocol.

10. The method of claim 9 where said retransmission protocol is initiated by said receiver.

11. The method of claim 9 where said retransmission protocol retransmits data symbols placed in different bins than the bins in which said data symbols were placed prior to retransmission.

12. The method of claim 1 where said step of establishing in said receiver said coding scheme includes receiving information about said coding scheme from said transmitter.

13. The method of claim 1 where said step of said transmitter sending a packet to said receiver, and said packet consists of a series of N frames of b bins each, with known symbols in each of said N×b bins (test packet), interposed therebetween packets of N×b bins each, with data symbols in said N×b bins (data packet), the improvement comprising the steps of:

processing said test packets received by said receiver, and installing in said transmitter a measure of error probability developed by said processing for N×B of said N×b bins, where $B \leq b$;

said transmitter determining a coding scheme based on the installed error probability measures;

said transmitter sending said data frames with information encoded according to said coding scheme;

establishing in said receiver said coding scheme;

and decoding in said receiver received data frames according to the established coding scheme.

14. A communication method where a transmitter's antenna sends to an receiver's antenna OFDM test frames that are interposed between OFDM data frames, where each OFDM frame has frequency b bins, with known symbols in each of said b bins of the test frames, the improvement comprising the steps of:

processing said test frames received by said receiver, and installing in said transmitter a measure of error probability developed by said processing for B of said b bins, where $B \leq b$;

said transmitter determining a coding scheme based on the installed error probability measures;

said transmitter sending said data frames with information encoded according to said coding scheme;

establishing in said receiver said coding scheme;

and decoding in said receiver received data frames according to the established coding scheme.

* * * * *